United States Patent
Dwyer et al.

(10) Patent No.: US 10,635,284 B2
(45) Date of Patent: *Apr. 28, 2020

(54) INTERACTIVE CONTROL OF THE CURVATURE OF LINKS

(71) Applicant: MICROSOFT TECHNOLOGY LICENSING, LLC., Redmond, WA (US)

(72) Inventors: Timothy Dwyer, Seattle, WA (US); Nathalie Henry Riche, Seattle, WA (US); Bongshin Lee, Issaquah, WA (US); Sheelagh Carpendale, Calgary (CA)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 8 days.

This patent is subject to a terminal disclaimer.

(21) Appl. No.: 15/924,818

(22) Filed: Mar. 19, 2018

(65) Prior Publication Data
US 2018/0210638 A1    Jul. 26, 2018

Related U.S. Application Data

(63) Continuation of application No. 14/341,770, filed on Jul. 26, 2014, now Pat. No. 9,940,005, and a
(Continued)

(51) Int. Cl.
G06F 3/0482    (2013.01)
G06F 3/0487    (2013.01)
(Continued)

(52) U.S. Cl.
CPC ...... *G06F 3/04847* (2013.01); *G06F 3/04842* (2013.01); *G06F 3/04845* (2013.01); *G06T 11/206* (2013.01); *G06T 2207/20072* (2013.01)

(58) Field of Classification Search
CPC .......................... G06F 3/04842; G06F 1/1616
See application file for complete search history.

(56) References Cited

U.S. PATENT DOCUMENTS 5,363,479 A    11/1994  Olynyk
5,751,931 A *  5/1998   Cox .................. G06T 11/206
                                              345/419
(Continued)

FOREIGN PATENT DOCUMENTS

CN    101859224 A    10/2010
CN    102077166 A    5/2011
(Continued)

OTHER PUBLICATIONS

"Adobe Illustrator CS5", Retrieved from https://web.archive.org/web/20120306015234/http://www.adobe.com/products/illustrator.html, Retrieved on Aug. 11, 2018, 2 Pages.
(Continued)

*Primary Examiner* — Rayeez R Chowdhury

(57) ABSTRACT

A link curvature processing module enables a user with the ability to control the curvature of links in a node-link diagram. As a node-link diagram is displayed to a user, the user may interact with the diagram and adjust the curvature of one or more links in the diagram to improve the readability of the diagram. The user's modification to the curvature of a link alters the shape of the link so that the position of the nodes connected to the link does not change. By providing the user with such control, the user is able to tailor the visual display of the links to the user's preference.

20 Claims, 16 Drawing Sheets

Related U.S. Application Data continuation of application No. 13/421,855, filed on Mar. 15, 2012, now Pat. No. 8,832,582.

(51) Int. Cl.
*G06F 3/0484* (2013.01)
*G06T 11/20* (2006.01)

(56) References Cited

U.S. PATENT DOCUMENTS

| | | | |
|---|---|---|---|
| 5,798,769 | A | 8/1998 | Chiu et al. |
| 6,154,212 | A | 11/2000 | Eick et al. |
| 6,377,259 | B1* | 4/2002 | Tenev .................. G06T 11/206 345/440 |
| 6,732,114 | B1 | 5/2004 | Aamodt et al. |
| 7,110,389 | B2 | 9/2006 | Ramanan et al. |
| 7,932,907 | B2 | 4/2011 | Nachmanson et al. |
| 2001/0045952 | A1 | 11/2001 | Tenev et al. |
| 2002/0085002 | A1 | 7/2002 | Lamping et al. |
| 2002/0196292 | A1 | 12/2002 | Itoh et al. |
| 2010/0182322 | A1 | 7/2010 | Gansner et al. |
| 2011/0154234 | A1 | 6/2011 | Winternitz et al. |
| 2011/0181595 | A1 | 7/2011 | Nachmanson et al. |
| 2012/0028099 | A1 | 2/2012 | Aoki |
| 2012/0280999 | A1 | 11/2012 | Nachmanson et al. |

FOREIGN PATENT DOCUMENTS

| | | |
|---|---|---|
| EP | 0738990 A2 | 10/1996 |
| EP | 0977154 A2 | 2/2000 |
| EP | 0702331 B1 | 3/2002 |
| EP | 0825559 B1 | 11/2004 |
| JP | H08305525 A | 11/1996 |
| JP | 2007317070 A | 12/2007 |

OTHER PUBLICATIONS

"Inkscape Draw Freely", Retrieved from https://web.archive.org/web/20120310000445/http://inkscape.org/, Mar. 5, 2012, 1 Page.

"Procrustes Analysis", Retrieved from https://en.wikipedia.org/wiki/Procrustes_analysis, Retrieved on Mar. 6, 2012, 5 Pages.

"Non Final Office Action Issued in U.S. Appl. No. 13/421,855", dated Dec. 6, 2013, 11 Pages.

"Supplementary Partial Search Report issued in European Patent Application No. 13760248.8", dated Dec. 7, 2015, 8 Pages.

"Supplementary Search Report issued in European Patent Application No. 13760248.8", dated May 19, 2016, 14 Pages.

"Non Final Office Action Issued in U.S. Appl. No. 14/341,770", dated Jul. 24, 2017, 11 Pages.

"First Office Action and Search Report Issued in Chinese Patent Application No. 201380014423.2", dated Aug. 1, 2016, 14 Pages.

"Second Office Action Issued in Chinese Patent Application No. 201380014423.2", dated Mar. 17, 2017, 7 Pages.

"Office Action issued in Japanese Patent Application No. 2015-500455", dated Dec. 22, 2016, 6 Pages.

Balzer, et al., "Level-of-Detail Visualization of Clustered Graph Layouts", In Proceedings of the 6th International Asia-Pacific Symposium on Visualization, Feb. 5, 2007, pp. 133-140.

Bartram, et al., "Filtering and Integrating Visual Information with Motion", Retrieved from http://jhc.unh.edu/sites/default/files/publications/Bartram02_InfoVis_Filtering_and_brushing_with_Motion.pdf, 2002, 17 Pages.

Beck, et al., "Visually Exploring Multi-Dimensional Code Couplings", In Proceedings of 6th IEEE International Workshop on Visualizing Software for understanding and Analysis, Sep. 29, 2011, 8 Pages.

Carpendale, et al., "Examining Edge Congestion", In Proceedings of Extended Abstracts on Human Factors in Computing Systems, Mar. 31 2001, pp. 115-116.

Cui, et al., "Geometry-Based Edge Clustering for Graph Visualization", In Proceedings of IEEE Transactions on Visualization and Computer Graphics, vol. 14, Issue 6, Oct. 24, 2008, pp. 1277-1284.

Dobkin, et al., "Implementing a General-Purposed Edge Router", In Proceedings of International Symposium on Graph Drawing, Sep. 18, 1997, 8 Pages.

Ersoy, et al., "Skeleton-Based Edge Bundling for Graph Visualization", In IEEE Transactions on Visualization and Computer Graphics, vol. 17, No. 12, Dec. 2011, pp. 2364-2373.

Fekete, et al., "Overlaying Graph Links on Treemaps", In IEEE Symposium on Information Visualization Conference Compendium, Oct. 19, 2003, 2 Pages.

Freivalds, Karlis, "Curved Edge Routing", In International Symposium on Fundamentals of Computation Theory, Aug. 22, 2001, 12 Pages.

Frisch, et al., "Investigating Multi-Touch and Pen Gestures for Diagram Editing on Interactive Surfaces", In Proceedings of the ACM International Conference on Interactive Tabletops and Surfaces, Nov. 23, 2009, 8 Pages.

Gansner, et al., "Multilevel Agglomerative Edge Bundling for Visualizing Large Graph", In IEEE Pacific Visualization Symposium, Mar. 1, 2011, pp. 187-194.

Ghoniem, et al., "On the Readability of Graphs Using Node-Link and Matrix-Based Representations: A Controlled Experiment and Statistical Analysis", In Journal of Information Visualization, vol. 4, Issue 2, Jul. 1, 2005, pp. 114-135.

Holten, et al., "A User Study on Visualizing Directed Edges in Graphs", In Proceedings of the SIGCHI Conference on Human Factors in Computing Systems, Apr. 4, 2009, 10 Pages.

Holten, et al., "Force-Directed Edge Bundling for Graph Visualization", In Proceedings of the 11th Eurographics / IEEE—VGTC Conference on Visualization, vol. 28, No. 3, Jun. 10, 2009, 8 Pages.

Holten, Danny, "Hierarchical Edge Bundles: Visualization of Adjacency Relations in Hierarchical Data", In IEEE Transactions on Visualization and Computer Graphics, vol. 12, No. 5, Sep. 2006, pp. 741-748.

Hurter, et al., "MoleView: An Attribute and Structure-Based Semantic Lens for Large Element-Based Plots", In IEEE Transactions on Visualization and Computer Graphics, vol. 17, No. 12, Dec. 3, 2011, 10 Pages.

Kaufmann. et al., "Drawing Graphs: Methods and Models", Retrieved from http://citeseerx.ist.psu.edu/viewdoc/download?doi=10.1.1.13.8604&rep=rep1&type=pdf, Oct. 13, 1999, 33 Pages.

Lambert, et al., "Winding Roads: Routing Edges into Bundles", In Proceedings of Eurographics / IEEE-VGTC Symposium on Visualization, vol. 29, No. 3, Jun. 2010, 10 Pages.

Luo, et al., "Ambiguity-Free Edge-Bundling for Interactive Graph Visualization", In IEEE Transactions on Visualization and Computer Graphics, vol. 18, No. 10, May 2012, 12 Pages.

McGuffin, et al., "Interaction Techniques for Selecting and Manipulating Subgraphs in Network Visualizations", In IEEE Transactions on Visualization and Computer Graphics, vol. 15, No. 6, Nov. 2009, pp. 937-944.

Moscovich, et al., "Topology-Aware Navigation in Large Networks", In Proceedings of the SIGCHI Conference on Human Factors in Computing Systems, Apr. 9, 2009, pp. 2319-2328.

"International Search Report and Written Opinion Issued in PCT Application No. PCT/US2013/028480", dated Jun. 21, 2013, 8 Pages.

Pupyrev, et al., "Edge Routing with Ordered Bundles". In International Symposium on Graph Drawing, Sep. 21, 2011, 14 Pages.

Purchase, Helen C., "Evaluating Graph Drawing Aesthetics: Defining and Exploring a New Empirical Research Area", In Computer Graphics and Multimedia: Applications, Problems and Solutions, 2004, 50 Pages.

Purchase, Helen C., "Which Aesthetic Has the Greatest Effect on Human Understanding", In International Symposium on Graph Drawing, Sep. 18, 1997, 14 Pages.

Qu, et al., "Controllable and Progressive Edge Clustering for Large Networks", In Proceedings of the 14th International Conference on Graph Drawing, Sep. 2006, pp. 399-404.

(56) References Cited

OTHER PUBLICATIONS

Riche, et al., "Exploring the Design Space of Interactive Link Curvature in Network Diagrams", In Proceedings of the International Working Conference on Advanced Visual Interfaces, May 21, 2012, 8 Pages.

Riche, et al., "Understanding Interactive Legends: A Comparative Evaluation with Standard Widgets", In Proceedings of the Eurographics / IEEE-VGTC Symposium on Visualization, vol. 29, No. 3, Jun. 2010, 10 Pages.

Schmidt, et al., "A Set of Multi-Touch Graph Interaction Techniques", In Proceedings of ACM International Conference on Interactive Tabletops and Surfaces, Nov. 7, 2010, 4 Pages.

Selassie, et al., "Divided Edge Bundling for Directional Network Data", In IEEE Transactions on Visualization and Computer Graphics, vol. 17, Issue 12, Dec. 2011, pp. 2354-2363.

Spritzer, et al., "Case Study of Co-Authorship Networks Using a Tool for Graph Visualization", In Workshop on Information Visualization and Analysis in Social Networks, 2008, pp. 41-50.

Spritzer, et al., "Design and Evaluation of MagnetViz—A Graph Visualization Tool", In IEEE Transactions on Visualization and Computer Graphics, vol. 18, No. 10, May 2012, 14 Pages.

Tudoreanu, et al., "Legends as a Device for Interacting with Visualizations", In Technical Report WUCS-01-44, 2001, 7 Pages.

Ware, Colin, "Information Visualization: Perception for Design", Published by Morgan Kaufmann, Second Edition, May 21, 2012, 34 Pages.

Wong, et al., "EdgeLens: An Interactive Method for Managing Edge Congestion in Graphs", in IEEE Symposium on Information Visualization, Oct. 21, 2003, 8 Pages.

Wong, et al., "Supporting Interactive Graph Exploration Using Edge Plucking", In International Society for Optics and Photonics, Visualization and Data Analysis, vol. 6495, Issue 649508, Jan. 29, 2007, 12 Pages.

Yi, et al., "Dust & Magnet: Multivariate Information Visualization Using a Magnet Metaphor", In Proceedings of Information Visualization, vol. 4, Issue 4, Dec. 1, 2005, 18 Pages.

"Office Action Issued in Korean Patent Application No. 1020147025551", dated Jul. 22, 2019, 5 Pages.

"Notice of Allowance Issued in Korean Patent Application No. 10-2014-7025551", dated Dec. 18, 2019, 3 Pages.

* cited by examiner

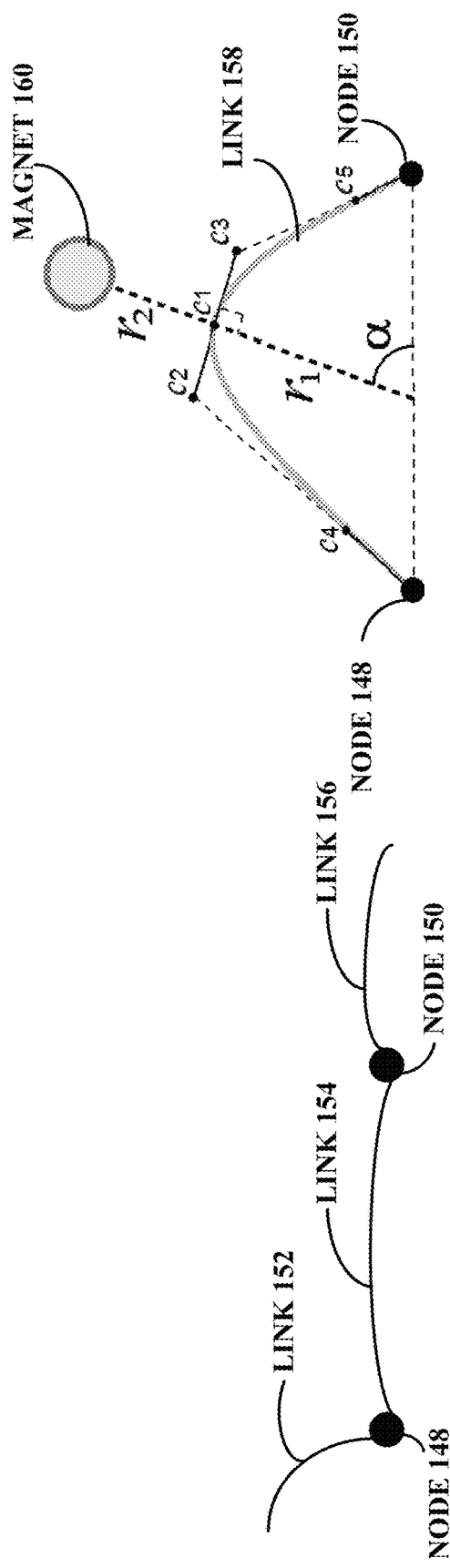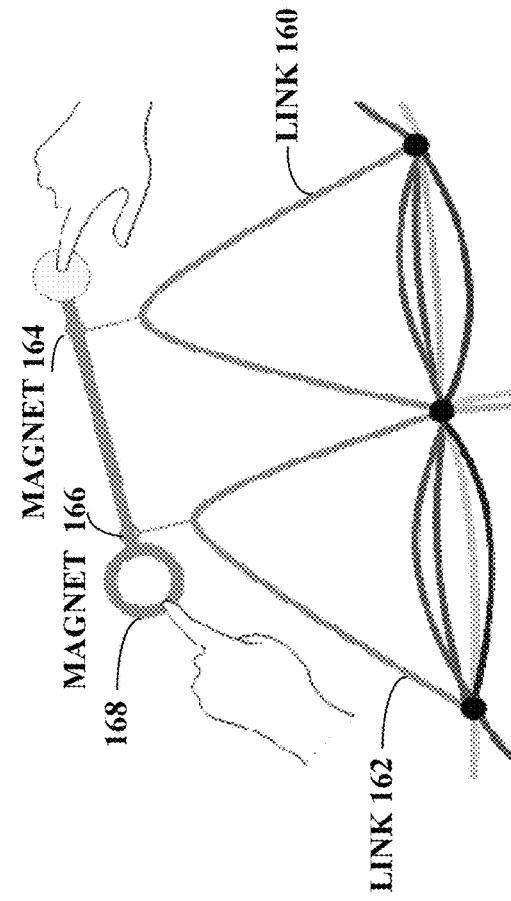
FIG. 5A
FIG. 5B
FIG. 5C

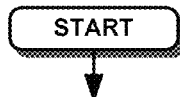

230

```
                    START
                      │
                      ▼
┌─────────────────────────────────────────────────────┐
│ DO FOR EACH LINK IN CLOCKWISE ORDER  236            │
│ ┌─────────────────────────────────────────────────┐ │
│ │ IF THE ANGLE BETWEEN THE LINK'S CURRENT POSITION│ │
│ │ AND AN ADJACENT LINK IS LESS THAN THE MINIMUM   │ │
│ │ SEPARATION ANGLE, THEN PLACE THE LINK IN THE    │ │
│ │ PREVIOUS ADJACENT LINK'S CHAIN AND PLACE A      │ │
│ │ CONTROL POINT ON THE CURRENT CIRCLE THAT        │ │
│ │ MEETS THE MINIMUM SEPARATION ANGLE              │ │
│ │ 238                                             │ │
│ └─────────────────────────────────────────────────┘ │
│                      │                              │
│                      ▼                              │
│ ┌─────────────────────────────────────────────────┐ │
│ │ IF THE ANGLE BETWEEN THE LINK'S CURRENT POSITION│ │
│ │ AND THE LINK'S ADJACENT LINK IS MORE THAN THE   │ │
│ │ MINIMUM SEPARATION ANGLE, THEN FORM A CHAIN     │ │
│ │ WITH THE LINK IN IT                             │ │
│ │ 240                                             │ │
│ └─────────────────────────────────────────────────┘ │
└─────────────────────────────────────────────────────┘
                      │
                      ▼
┌─────────────────────────────────────────────────────┐
│ DO FOR EACH CHAIN  242                              │
│ USE PROCRUSTES ANALYSIS TO DETERMINE THE CONTROL    │
│ POINTS FOR EACH LINK IN THE CHAIN FOR EACH LINK TO  │
│ MEET THE MINIMUM SEPARATION ANGLE AND HAS MINIMAL   │
│ LENGTH                                              │
│ 244                                                 │
└─────────────────────────────────────────────────────┘
                      │
                      ▼
                   RETURN
```

*FIG. 9*

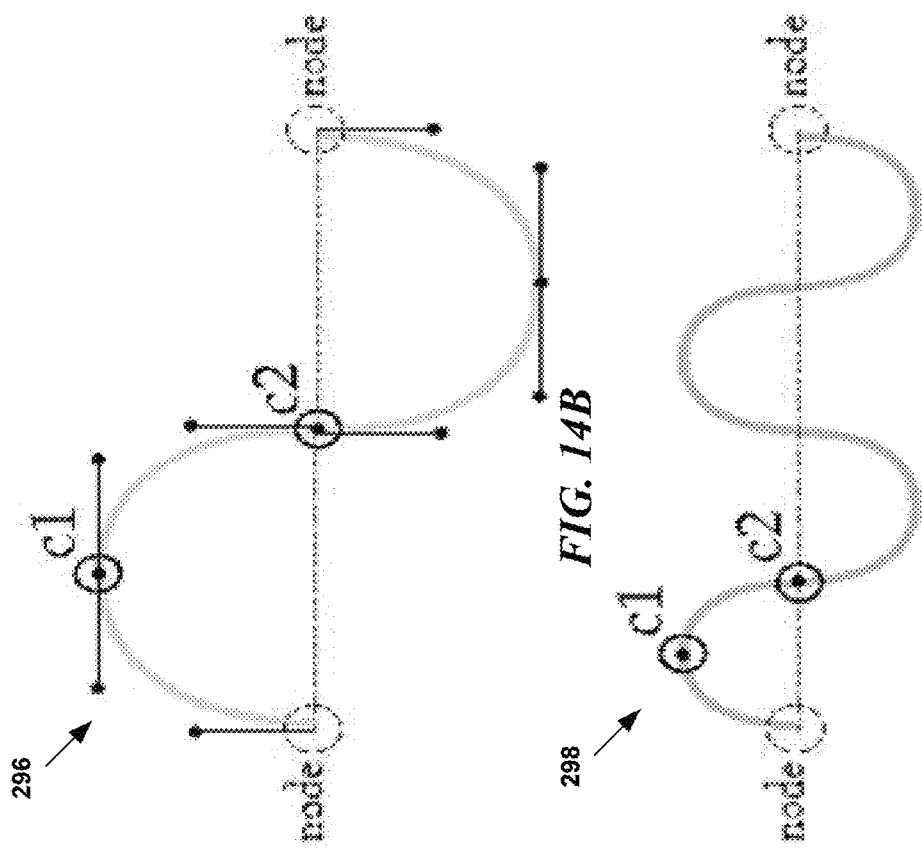
FIG. 14B
FIG. 14C
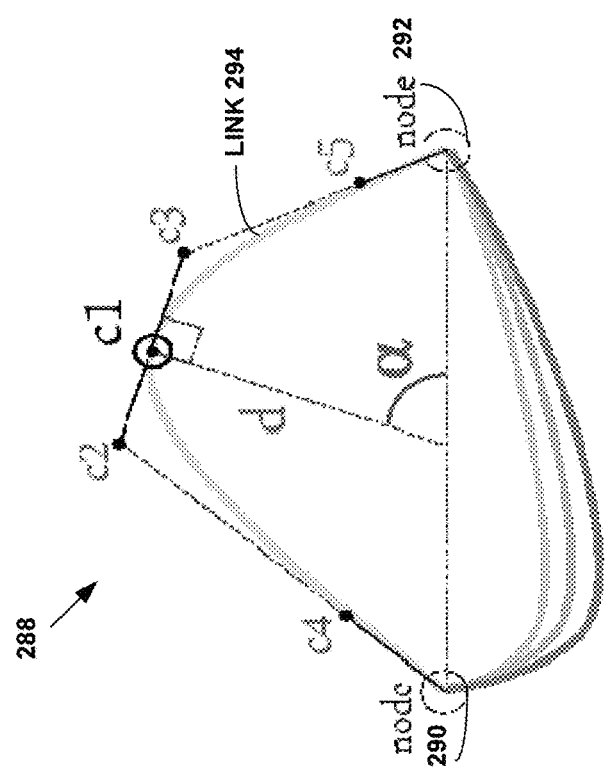
FIG. 14A

INTERACTIVE CONTROL OF THE CURVATURE OF LINKS

CROSS REFERENCE TO RELATED APPLICATIONS

This is a continuation of application Ser. No. 14/341,770 filed on Jul. 26, 2014, entitled "INTERACTIVE CONTROL OF THE CURVATURE OF LINKS", which is a continuation of application Ser. No. 13/421,855 filed on Mar. 15, 2012, also entitled "INTERACTIVE CONTROL OF THE CURVATURE OF LINKS", both of which are herein incorporated by reference.

BACKGROUND

A graph is a data structure commonly used to present data in a structured manner. A graph consists of nodes and links where each node represents an object and a link, also known as an "edge", connects a source node to a target node. Graphs are commonly used in a variety of applications to model the flow of information, to model the relationship between entities, and so forth. For example, in a social network, the nodes of the graph may represent individuals and the edges may represent a relationship between two individuals. In an airline network, the nodes may represent cities and a sequence of edges may represent routes from one city to another.

A node-link diagram is a construct used to visualize a graph where a graphical object, such as a box or dot, depicts a node and a curve is used to represent a link between two nodes. A node-link diagram having a large number of nodes and links suffers from visual clutter. The visual clutter is often attributable to link congestion when multiple links overlap each other making it difficult to distinguish a particular link or a subset of links.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A user may interact with a node-link diagram, on the fly, to identify portions of the diagram that require additional visual clarity. In particular, congested links may be separated in numerous ways in order to improve the readability of the diagram. An interactive link fanning technique enables a user to alter the curvature of links connected to a node by spreading or fanning out the links to a user-specified fanning radius. A minimum separation angle is determined based on the user-specified fanning radius which is then used to determine the minimum separation angle needed between adjacent links. The smooth curve used to represent the links is calculated to minimize the length of each link from its source node to its target node subject to the constraint that link curves must be smooth and separated by a minimum amount.

An interactive link bundling technique enables a user to select a subset of links which should share a common path through automatically generated or user defined control points. The user can directly manipulate the location and size of these control points to further refine the bundle path or to adjust the separation of link curves within the bundle.

An interactive link magnet technique enables a user to use a draggable graphic object, referred to as an interactive link magnet, to magnetically attract links having a data attribute that matches the interactive link magnet. The magnetic attraction alters the curvature of the matching links in a direction towards the magnet thereby separating out the matching links from the rest of the node-link diagram for better visualization.

An interactive link legends technique enables a user to control the shape of a model curve that is part of the node-link diagram's legend. A user may interact with one or more control points on the model curve to alter the curvature of a link associated with the model curve. The resulting curvature is then propagated throughout the node-link diagram to all links associated with the model curve.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIGS. 5A-5C are exemplary illustrations showing interactive link magnets.

FIG. 9 is a flow diagram illustrating a second exemplary method of the interactive link fanning.

FIGS. 14A-14C are exemplary illustrations showing the interactions used to alter the curvature of the links in the interactive link legends.

DETAILED DESCRIPTION

Various embodiments pertain to a technology for enabling a user to control the curvature of links in a node-link diagram. As a node-link diagram is displayed to a user, the user may interact with the diagram and adjust the curvature of one or more links in the diagram to improve the readability of the node-link diagram. The links in a node-link diagram are presented as smooth curves drawn as splines by carefully constructed control points. The curvature of a link may be altered such that the amplitude and/or skew angle of the smooth curve is enlarged while the nodes connected to the link remain in the same position. By providing the user with such control, the user is able to tailor the visual display of the links to the user's preference.

The embodiments cover four techniques: interactive link fanning; interactive bundling; interactive link magnet; and interactive link legends. Each technique provides a user with a different capability to interact, in real time, with a node-link diagram. The interactive link fanning technique enables a user to alter the curvature of links connected to a node by spreading or fanning out the links to a user-specified fanning radius. Curve control points are automatically located in order to achieve a user-specified minimum separation angle between adjacent links. The smooth curve used to represent the links is calculated to respect the minimum separation angle while minimizing the length of each link from its source node to its target node.

An interactive link bundling technique enables a user to select a subset of links which should share a common path through automatically generated or user defined control points. The user can directly manipulate the location and size of these control points to further refine the bundle path or to adjust the separation of link curves within the bundle.

An interactive link magnet technique enables a user to use a draggable graphic object, referred to as an interactive link magnet, to magnetically attract links having a data attribute that matches the interactive link magnet. The magnetic attraction alters the curvature of the matching links in a direction towards the magnet thereby separating out the matching links from the rest of the node-link diagram for better visualization.

An interactive link legends technique enables a user to control the shape of a model curve that is part of the node-link diagram's legend. A user may interact with one or more control points on the model curve to alter the curvature of a link associated with the model curve. The resulting curvature is then propagated throughout the node-link diagram to all links associated with the model curve.

Figure 1:
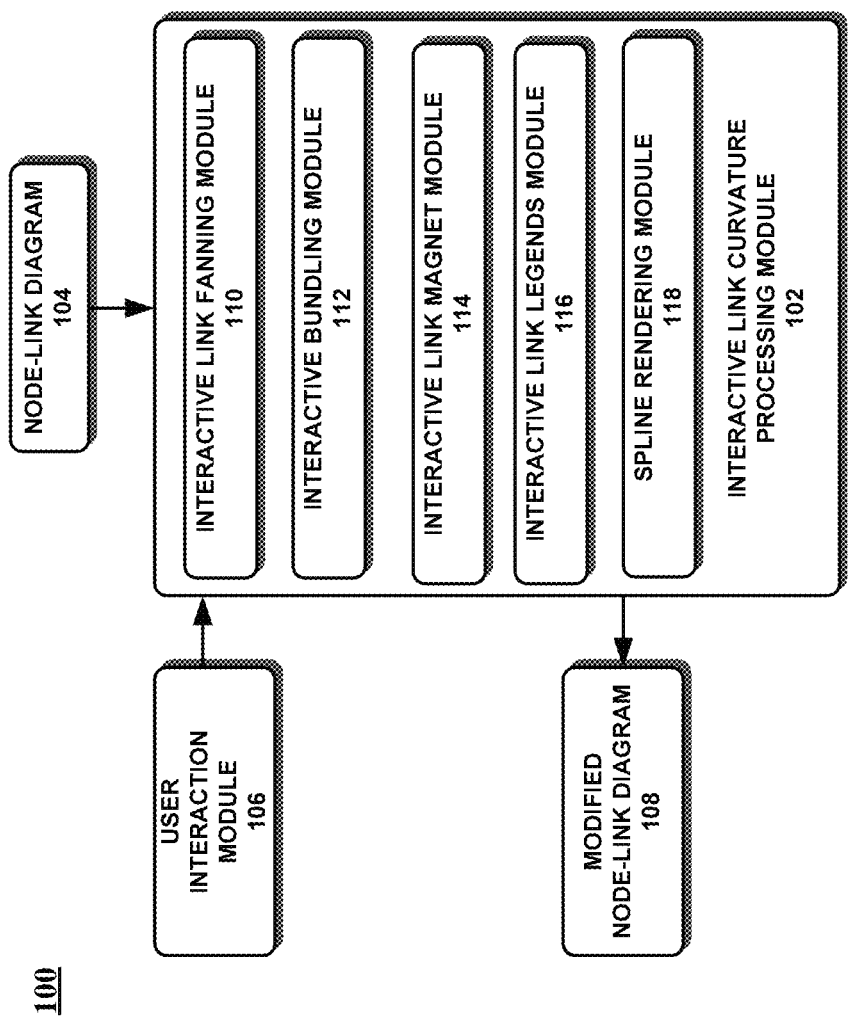
FIG. 1 illustrates an exemplary system that provides a user with capabilities to control the curvature of links within a node-link diagram.

Attention now turns to a discussion of an exemplary system enabling a user to interactively control the link curvature in node-link diagrams. FIG. 1 illustrates a block diagram of an exemplary system 100 having an interactive link curvature processing module 102 that receives a node-link diagram 104 and user actions detected by a user interaction module 106. Based on the user actions detected, the interactive link curvature processing module 102 alters the curvature of one or more links and engages a spline rendering module 118 to render a modified portion of the node link diagram 104.

The interactive link curvature processing module 102 may include any one or more integrated link curvature techniques, such as an interactive link fanning module 110, an interactive bundling module 112, an interactive link magnet module 114, and/or an interactive legends module 116. The interactive link curvature processing module 102 modifies the node-link diagram 104 in accordance with the user actions thereby generating a modified node-link diagram 108 tailored to the user's preference.

The system 100 may be implemented on a computing device that may be any type of electronic device capable of executing programmable instructions. The computing device may be implemented as a mobile device, a personal digital assistant, a mobile computing device, a smart phone, a cellular telephone, a handheld computer, a server, a server array or server farm, a web server, a network server, an Internet server, a work station, a mini-computer, a main-frame computer, a supercomputer, a network appliance, a web appliance, a distributed computing system, multiprocessor systems, or combination thereof.

Figure 2:
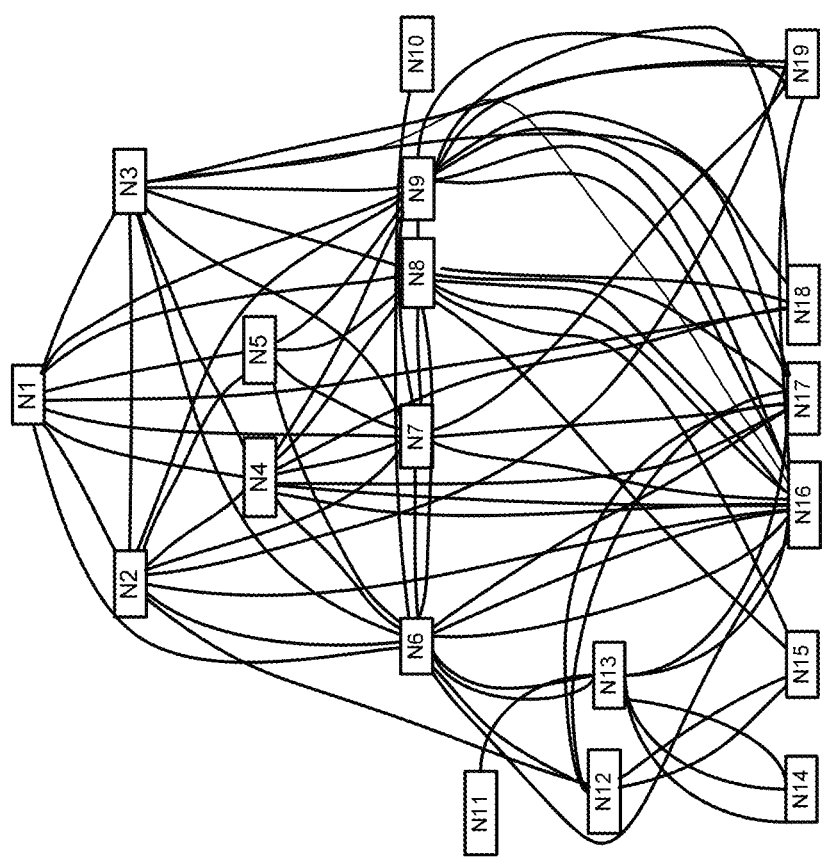
FIG. 2 illustrates an exemplary node-link diagram.

A node-link diagram 104 is a graph having a set of nodes and a set of links. A link is an edge that connects two nodes. A node-link diagram 104 is a data structure that may be used to represent any type of system, such as, without limitation, a social network, a state machine associated with a physical system, an air traffic network, a computer program's data flow, a communication network, and so forth. Referring to FIG. 2, there is shown a node-link diagram 104 having a collection of nodes, labeled N1-N19, and links connecting the nodes to each other. The node-link diagram 104, as shown in FIG. 2, shows a dense collection of links that are difficult to distinguish within the node-link diagram 104. The interactive link curvature processing module 102 is configured to improve the visual representation of links within the node-link diagram 104 thereby improving the user's understanding of the node-link diagram 104.

It should be noted that the embodiments are not limited to a node-link diagram and the embodiments may be applied to other types of graphical representations, such as, without limitations, link overlays on treemaps, trees, graphs, and so forth.

Referring back to FIG. 1, a user may interact with the interactive link curvature processing module 102 through a user interaction module 106. The user interaction module 106 represents any functionality for processing user inputs that may be received by any type of input device or combination of input devices. The input device may be mouse, keyboard, a touch screen display, and the like. The user interaction module 106 may detect a mouse click, keystroke, gesture, touch, voice command, and any other type of user action. When the user action is detected while the node-link diagram 104 is displayed, the user action is transmitted to the interactive link curvature processing module 102.

Figure 3B:
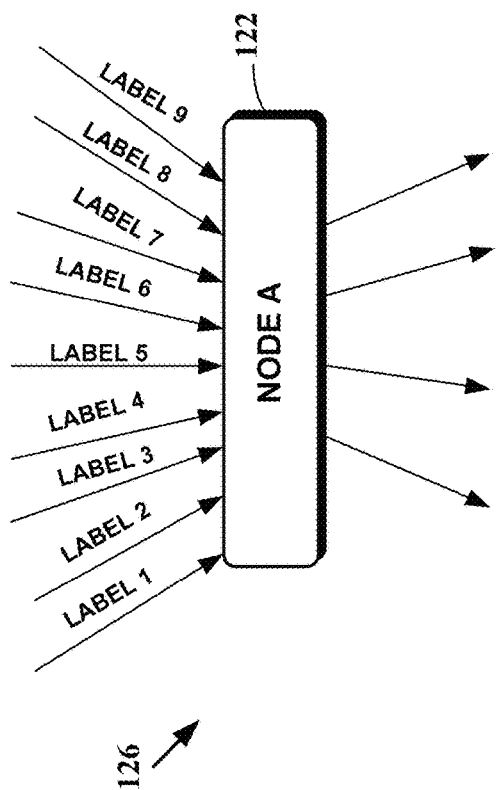
FIGS. 3A-3C are exemplary illustrations showing interactive link fanning.
Figure 3C:
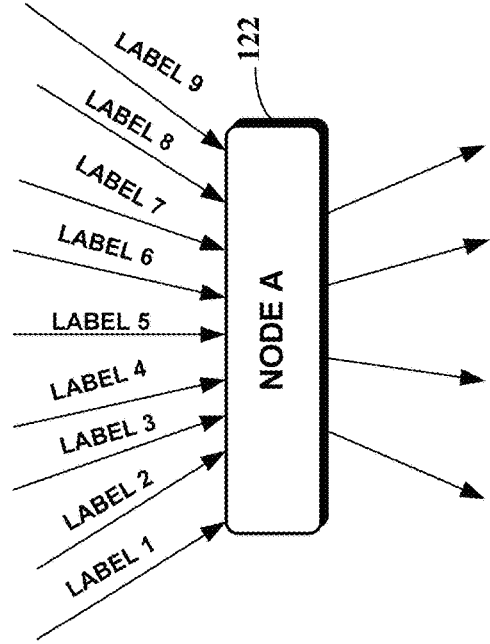
Figure 3A:
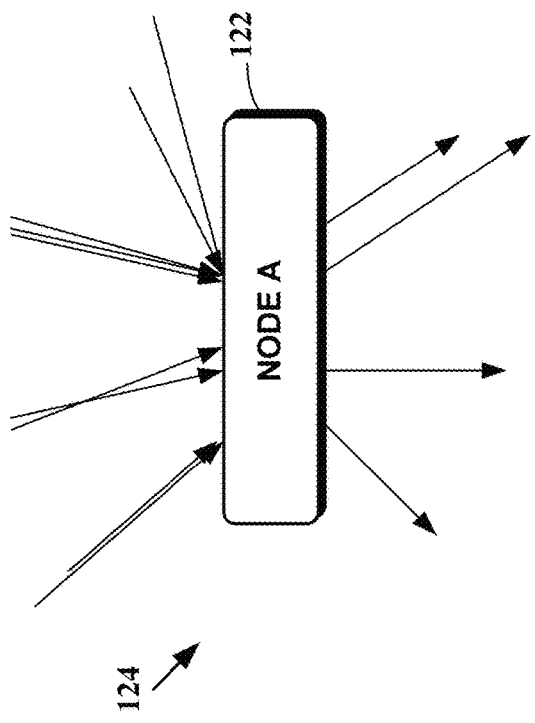

The interactive link fanning module 110 may be used to expand the separation distance between adjacent links at one or more nodes thereby improving the readability of the links associated with a particular node. Referring to FIG. 3A, there is shown a portion of a node-diagram 124 having a Node A 122 with nine links entering the node and four links exiting the node. Several of the links entering the node overlap making it difficult to understand the flow that the links represent. FIG. 3B shows the node-link diagram 126 with the links associated with Node A 122 fanned out so that there is space between each link. The space between each link may be used to insert a label, LABEL 1-LABEL 9, for each link in the node-link diagram 128 as shown in FIG. 3C.

Figure 4:
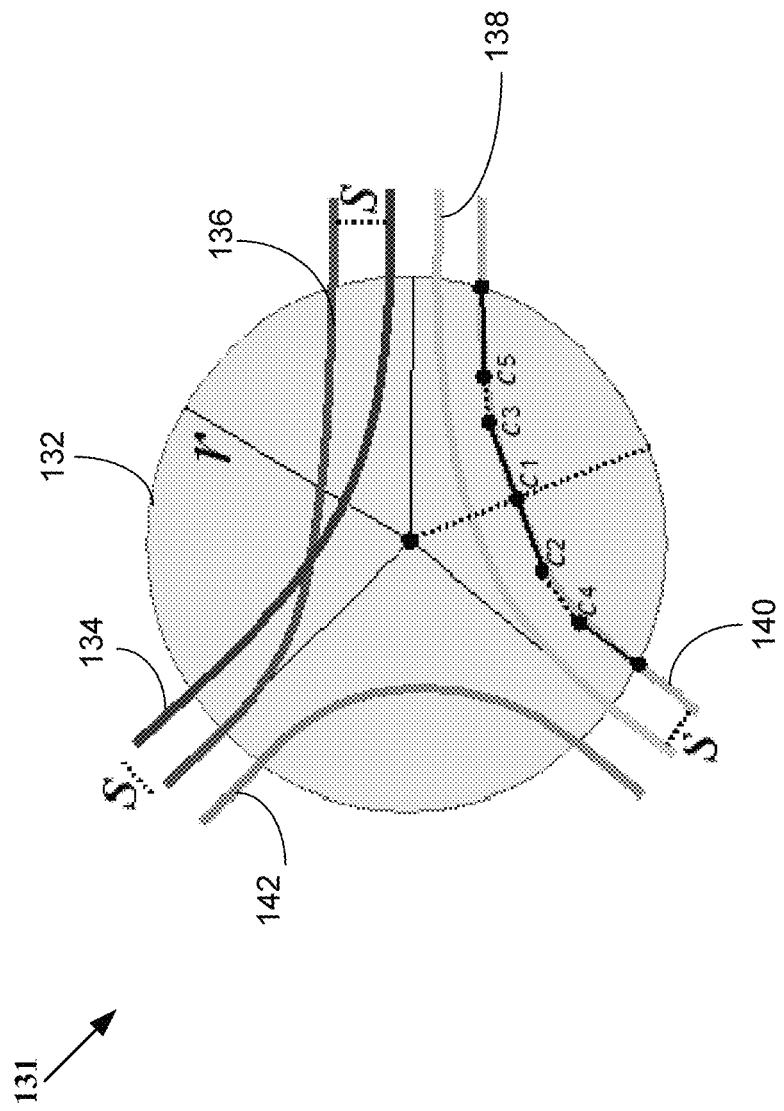
FIG. 4 is an exemplary illustration showing interactive link bundling.

Referring back to FIG. 1, the interactive bundling module 112 may be utilized to allow a user to select a subset of links that the user wishes to view in a layout that distinguishes the links more clearly. FIG. 4 illustrates an example of the interactive bundling technique. A user may select a subset of links by drawing a line through the links of interest. The interactive bundling module 112 generates a layout of the links 131 where there is angular separation between each link 134, 136, 138, 140, 142 in the bundle which allows each link to be easily distinguishable. As shown in FIG. 4, the links selected by the user are shown displayed in attenuation circle 132 where each link 134, 136, 138, 140, 142 is separated from each adjacent link by the distance S.

Referring back to FIG. 1, the interactive link magnet module 114 enables a user to control the curvature of the links associated with the same particular data attribute. A data attribute may be an identifier or label that is associated with a subset of links. For example, a node-link diagram may contain airline routes where each route consists of a sequence of links. Each link in a route may be associated with a data attribute that corresponds to the name of an airline carrier that services the route. A user may wish to view the links associated with a particular airline carrier more clearly. A virtual magnet may be used to pull those links out towards the position of the magnet so that the links are distinguishable from the rest of links in the node-link diagram 104.

FIG. 5A shows a portion of a node-link diagram having three links 152, 154, 156 and nodes 148, 150. FIG. 5B shows the placement of a magnet 160 that attracts link 158 which has a matching data attribute to the data attribute associated with the magnet. The magnetic strength of the magnet 160 alters the curvature of link 158 without altering the placement of nodes 148, 150. As shown in FIG. 5B, the direction of the magnetic force is shown by the angle $\propto$, the strength of the magnet pulls the link a distance of radius, $r_1$, from the link's original position. The radius $r_2$ is the distance of the new curvature to the center of the magnet. The magnet 160 alters the curvature of the link to a curve defined by control points c1-c5 which are used to generate a spline curve representing the modified link 158.

Although the link magnets have been shown as circular shapes having a clear center point with a magnetic strength characterized by a radius, other shapes may be used such as polyline magnets. For example, FIG. 5C illustrates a line magnet 168 having two magnets 164, 166 arranged in a linear format. Each magnet 164, 166 operates as noted above with respect to FIG. 5B and provides the user with the ability to control the curvature of several links over a wider area of the node-link diagram.

Figure 6A:
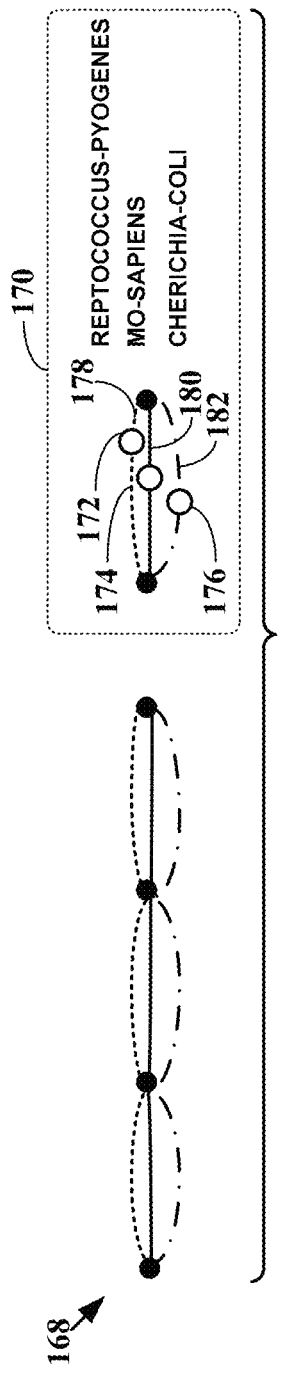
FIGS. 6A-6B are exemplary illustrations showing interactive link legends.

Referring back to FIG. 1, the interactive legends module 116 allows a user to control the curvature of a subset of links sharing a common attribute by altering a model curve representing the curvature of the link shown in a legend that is part of the node-link diagram. Referring to FIG. 6A, there is shown a node-link diagram 168 illustrating the reaction of certain bacterial strains. The node-link diagram 168 is a directed graph where each source node represents a substrate and the destination node is a product. The link between the source and destination node represents a bacterial strain. The node-link diagram 168 has a legend 170 showing a model curve associated with each bacterial strain in the node-link diagram 168. There is a model curve 178 associated with links representing the reptococcus-pyogenes strain, model curve 180 associated with links representing the mo-sapiens strain, and model curve 182 associated with links representing the cherichia-coli strain.

Figure 6B:
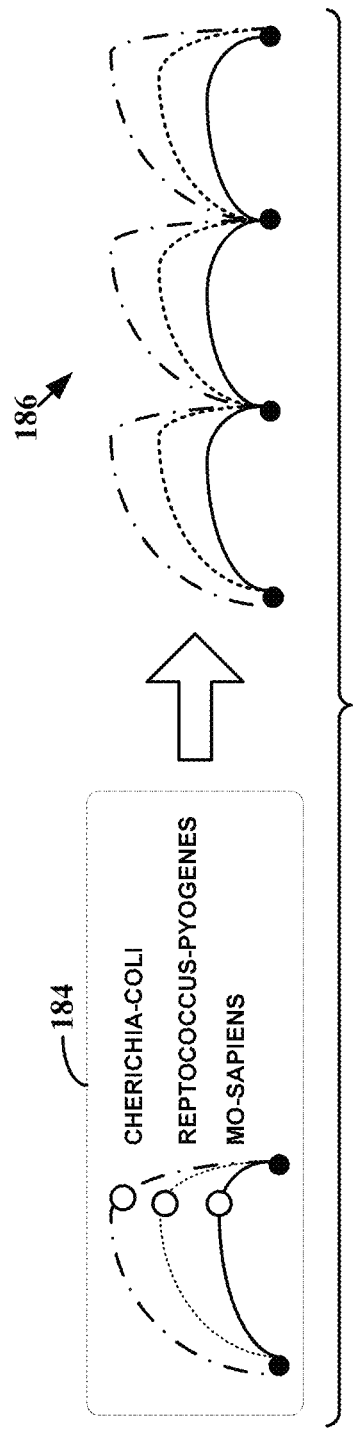

Each model curve has a corresponding control point 172, 174, 176. A user may use the control point on the model curve associated with a particular bacterial strain to alter the amplitude and skew angle of the curvature of all links associated with the same bacterial strain. The modifications made to a model curve are then propagated back to all links associated with the particular bacterial strain associated with the model curve throughout the node-link diagram. FIG. 6B shows the link curvature modifications propagated throughout the entire node-link diagram 186.

Referring back to FIG. 1, the spline rendering module 118 may be used to draw the modified links in the node-link diagram. The links are constructed as curves that may be implemented as splines (e.g., Bezier spline or B-spline curves, cardinal splines, etc.). A B-spline curve is a sequence of curve segments connected together to form a continuous curve. A B-spline is typically defined by four control points and a set of polynomial equations. The spline rendering module 118 constructs a curve using the coordinates of the control points and the set of polynomial equations representing a curve.

A B-spline curve is defined by control points and a knot vector. The knot vector contains a set of knot points, where each knot point is a position on the curve that subdivides the curve into a curve segment. The values of the knots are used to change the shape of a particular curve segment without changing the shape of the whole curve. The interactive link curvature processing module 102 alters one or more curve segments of a B-spline curve in order to generate the curvature of one or more links that comply with the user's action.

Some of the embodiments are described with respect to B-spline curves for illustration purposes. However, the embodiments are not constrained to B-spline curves and other such smooth curves may be utilized, such as, without limitation, quadratic or cubic Bezier curves, uniform or cardinal splines, etc.

The interactive link fanning module 110, interactive bundling module 112, interactive link magnet module 114, interactive legends module 116, and spline rendering module 118 may be a sequence of computer program instructions, that when executed by a processor, causes the processor to perform methods and/or operations in accordance with a prescribed task. These modules may be implemented as program code, programs, procedures, module, code segments, program stacks, middleware, firmware, methods, routines, and so on. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Any one or combination of the interactive link fanning module 110, interactive bundling module 112, interactive link magnet module 114, and/or interactive legends module 116 may be embodied in a software application that utilizes computer graphics to visualize graphs and/or diagrams. Examples of such software applications, may include without limitation, an Integrated Development Environment (IDE), a spreadsheet program, a graphics or diagram editor, page layout or design software, a web browser, a presentation graphics application, a word processing application, and so forth.

Although the system 100 shown in FIG. 1 has a limited number of elements in a certain configuration, it should be appreciated that the system 100 can include more or less elements in alternate configurations. Furthermore, in various embodiments, the system 100 described herein may comprise a computer-implemented system having multiple elements, programs, procedures, modules. As used herein, these terms are intended to refer to a computer-related entity, comprising either hardware, a combination of hardware and software, or software. For example, an element may be implemented as a process running on a processor, a hard disk drive, multiple storage drives (of optical and/or magnetic storage medium), an object, an executable, a thread of execution, a program, and/or a computer. By way of illustration, both an application running on a server and the server may be an element. One or more elements may reside within a process and/or thread of execution, and an element may be localized on one computer and/or distributed between two or more computers as desired for a given implementation. The embodiments are not limited in this manner.

Attention now turns to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. The methods can be implemented using one or more hardware elements and/or software elements of the described embodiments or alternative embodiments as desired for a given set of design and performance constraints. For example, the methods may be implemented as logic (e.g., computer program instructions) for execution by a logic device (e.g., a general-purpose or specific-purpose computer).

Figure 7:
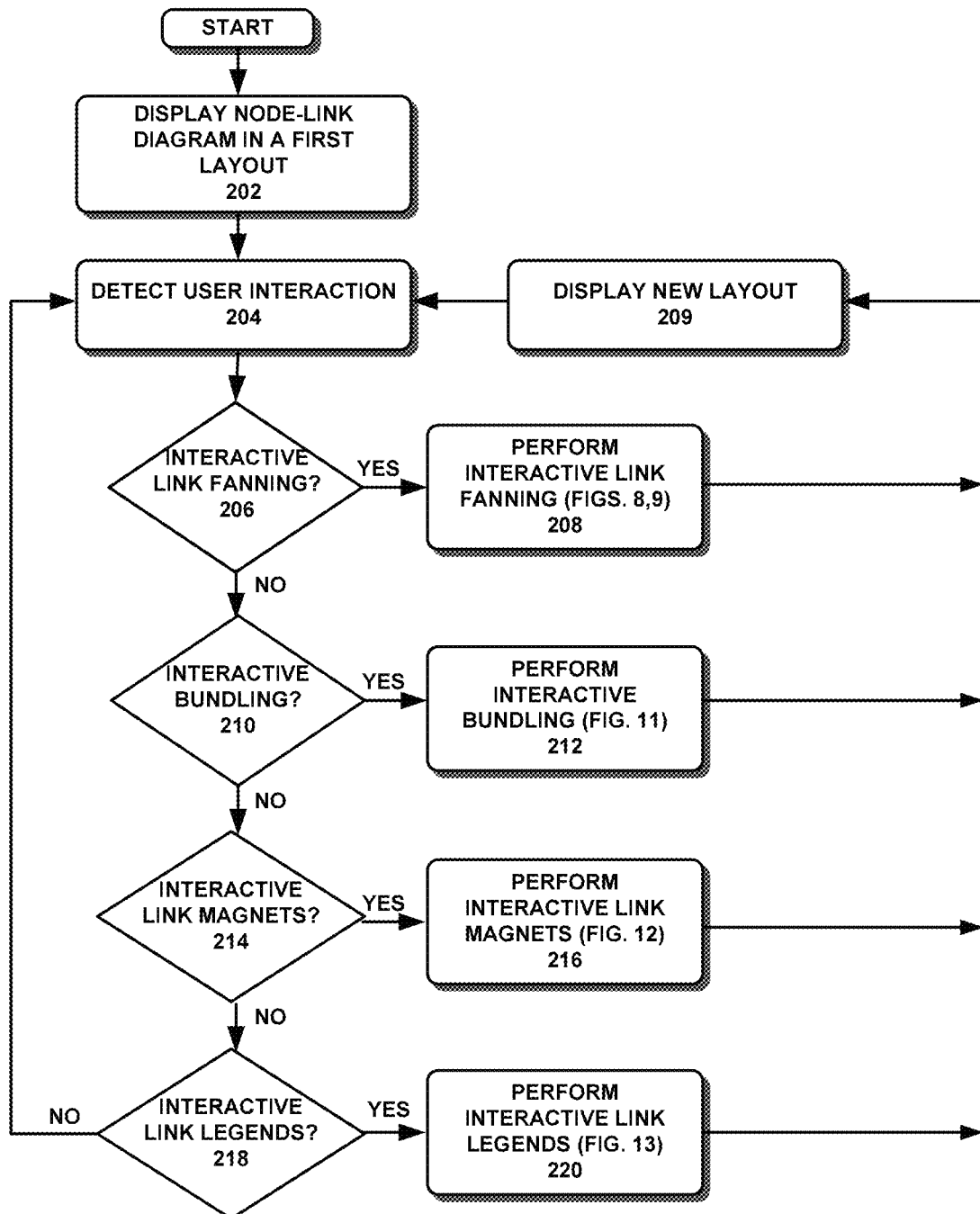
FIG. 7 is a flow diagram illustrating an exemplary method of the interactive link curvature processing.

FIG. 7 illustrates a flow diagram of an exemplary method 200 for modifying a curvature of links in a node-link diagram. It should be noted that the method 200 may be representative of some or all of the operations executed by one or more embodiments described herein and that the method can include more or less operations than what is described in FIG. 7.

Referring to FIG. 7, a node-link diagram is displayed to a user in a first layout (block 202). The user interaction module 106 detects a user action performed on the node-link diagram (block 204). Based on the user action, one of the interactive link curvature methods may be activated. If the user enacts a touch, gesture, or the like, to fan out the links of a node (block 206—yes), then the interactive link curvature method may be performed (block 208). Otherwise (block 206—no), if the user draws a line through a set of links on the node-link diagram (block 210—yes), then the interactive link bundling method may be performed (block 212). Otherwise (block 210—no), if the user facilitates the use of magnets (block 214—yes), then the interactive link magnet method may be performed (block 216). Otherwise (block 214—no), if the user interacts with a control point on a modeled curve in a legend (block 218—yes), then the interactive link legends method may be performed (block 220). Otherwise (block 218—no), the process awaits the next user action (block 204). Upon the completion of the performance of each method (blocks 208, 212, 216, 220), a new layout of the node-link diagram is displayed to the user (block 209) and the process waits for the next user action (block 204).

Figure 8:
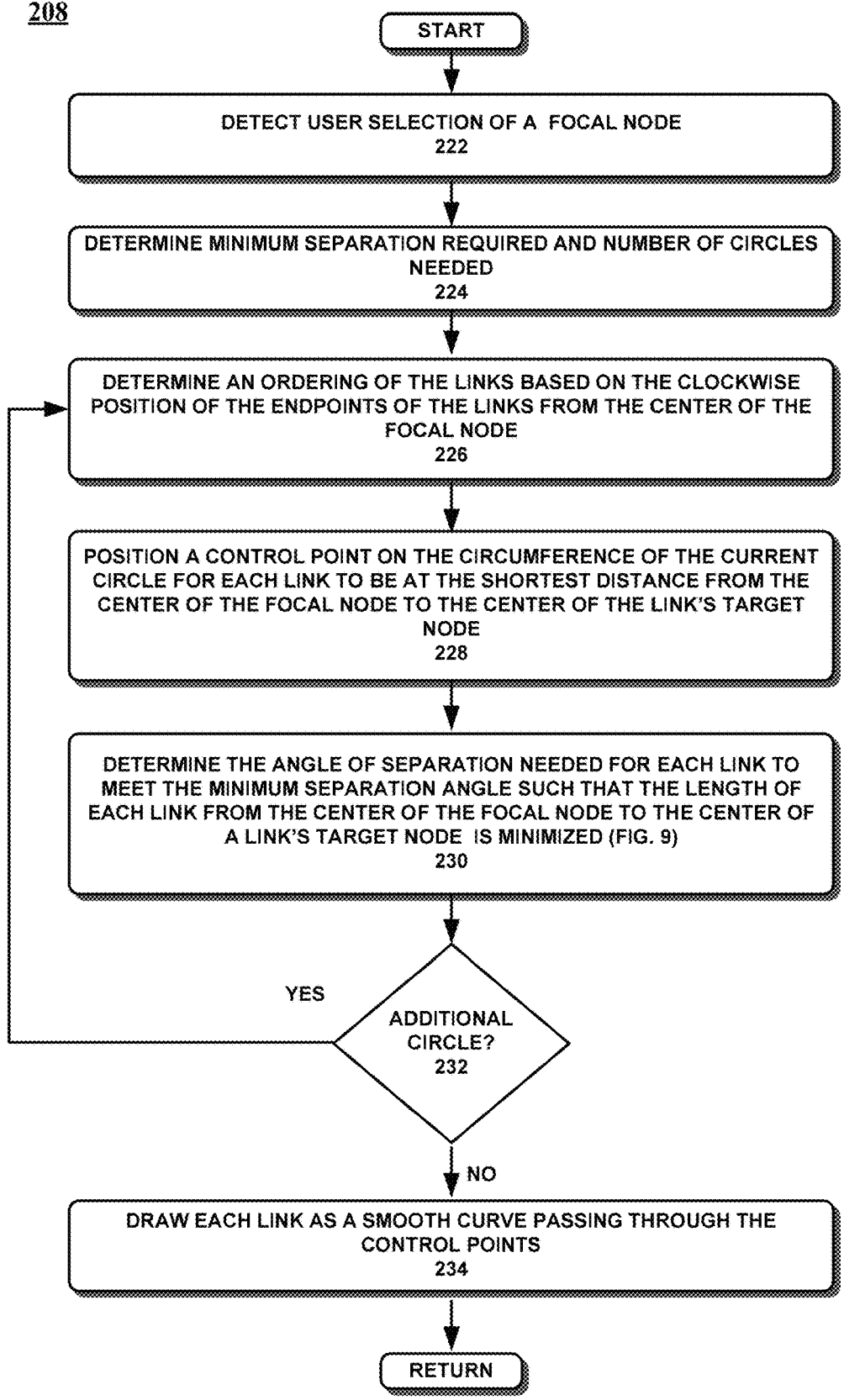
FIG. 8 is a flow diagram illustrating a first exemplary method of the interactive link fanning.

FIG. 8 illustrates a flow diagram of an exemplary method 208 for performing interactive link fanning. It should be noted that the method 208 may be representative of some or all of the operations executed by one or more embodiments described herein and that the method can include more or less operations than what is described in FIG. 8.

In interactive link fanning, the separation between adjacent links connected to a node is increased in order to improve the readability of the links connected to a particular node. The increased separation between adjacent links allows for the insertion of legends or other indicia to be associated with a link. In one or more embodiments, the separation distance between adjacent links may be calculated to be the same size even though this may result in an increased length of a link to its target node. In other embodiments, the separation distance between adjacent links may be calculated to be the minimum size needed to produce the desired spreading radius subject to minimizing the length of each link from the focal node to its respective target node and minimizing the number of link crossings.

The inputs to the interactive link fanning module 110 may be the following: (1) a set of links attached to the selected or focal node; (2) the center point of the focal node; (3) the center points of the target nodes for each of the links attached to the focal node; (4) a minimum radius, $r_1$, for an inner circle around the center of the focal node used to determine control points for the inner curve segment; (5) a number of additional concentric circles, where each circle is used to determine control points for additional spline segments; (6) the minimum separation, S, between adjacent links; and/or (7) the minimum radius for each of the concentric circles, $r_1$-$r_n$. Each concentric circle is used to determine the control points for an additional spline segment. The output of the interactive link fanning module 110 is the control points representing the curve segments that constitute the modified curvature of each link.

The interactive link fanning module 110 determines an initial placement for each link by determining the control points that would place a straight line from the center of the focal node to the center of each target node. These control points are placed on the circumference of the inner circle. These control points represent the shortest distance, or the minimal length of a link, from the focal node to its target node.

The links are then analyzed in a clockwise order. Each link that does not meet the minimum separation angle is then put in the previous link's chain and those links that exceed the minimum separation angle are placed in a new chain. Each chain contains the adjacent links that do not meet the minimum separation requirement. After visiting all the links, there may be a set of chains.

The links in each chain are then fanned out to satisfy the minimum angle separation using Procrustes analysis. Procrustes analysis is a mathematical technique used to find a projection of a rigid scale and/or rotation invariant constraint that indicates how much each link in a chain is to be moved to achieve the minimum separation angle. This projection allows an optimal movement to be determined for each link while moving other links as little as possible. Procrustes analysis allows fast processing of movement determinations performed in real time. However, after fanning, a new overlap may be created between the chains, where a link may be positioned too close to an adjacent link. For this reason, the chains are reanalyzed and the fanning may be reapplied.

Referring to FIG. 8, the user interaction module 106 may detect that the user touched a node (block 222). The user may use a two finger gesture to select a node and to simultaneously control the radius of a circle encapsulating the node (i.e., fanning or spreading radius) (block 222). Referring to FIG. 10A, there is shown a two-finger gesture that may be used to initiate interactive link fanning on a node 244. An index finger of a right hand 246 may be used to select the node 244 and the index finger of a left hand 250 may be used to control the initial fanning radius 248.

Referring back to FIG. 8, the minimum separation between adjacent links and the number of concentric circles is determined (block 224). The minimum separation between adjacent links S may be any separation specified by the user to give a pleasing minimal angle, but should be in the range: S<=(number of links)/(circumference of the inner circle). The circumference of the inner circle is based on the fanning radius provided by the user. The number and dimension of additional concentric circles may be a user input or automatically determined by the length of the longest link. The radius of the largest of the additional concentric circles would not exceed the distance of the furthest target node from the focal node. Each concentric circle produces a set of control points that are used to generate spline segments that when combined with control points from other concentric circles forms the curvature of a link.

An ordering of the links is then determined (block 226). In one or more embodiments, the order may be based on the clockwise position of the endpoints of the links from the center of the focal node (block 226). Next, an initial control point is placed on the circumference of the inner circle where the control point would produce a curve having the shortest length from the center of the focal node to the center of its target node (block 228). Then, the angle of separation is determined for each link so that the minimum separation angle is met while minimizing the length of each link from the center of the focal node to the center of the target node (block 230). Blocks 226-230 are repeated for each additional concentric circle that needs to generate additional control points. If an additional circle is required (block 232—yes), then blocks 226-230 are repeated. When all circles have been processed (block 232—no), then each link is drawn as a smooth curve passing through the control points (block 234).

FIG. 9 illustrates the steps used to determine the angle of separation for each link. Each link is analyzed in the clockwise order previously determined in block 226 (block 236). If the current angle of separation between the link and an adjacent link is less than the desired minimum separation angle, then the link is placed in the chain of the link that precedes it in the clockwise order (block 238). A control point is placed on the circumference of the current circle that meets the minimum separation angle (block 238). If the current angle of separation between the link and an adjacent angle is more than the minimum separation angle, then the link is placed into a new chain (block 240). After all the links are analyzed, then each chain is analyzed.

For each chain (block 242), Procrustes analysis is used to determine the control points for each link in the chain that meets the minimum separation angle and which minimizes the lengths of the links (block 244). The process returns to FIG. 8.

Figure 10B:
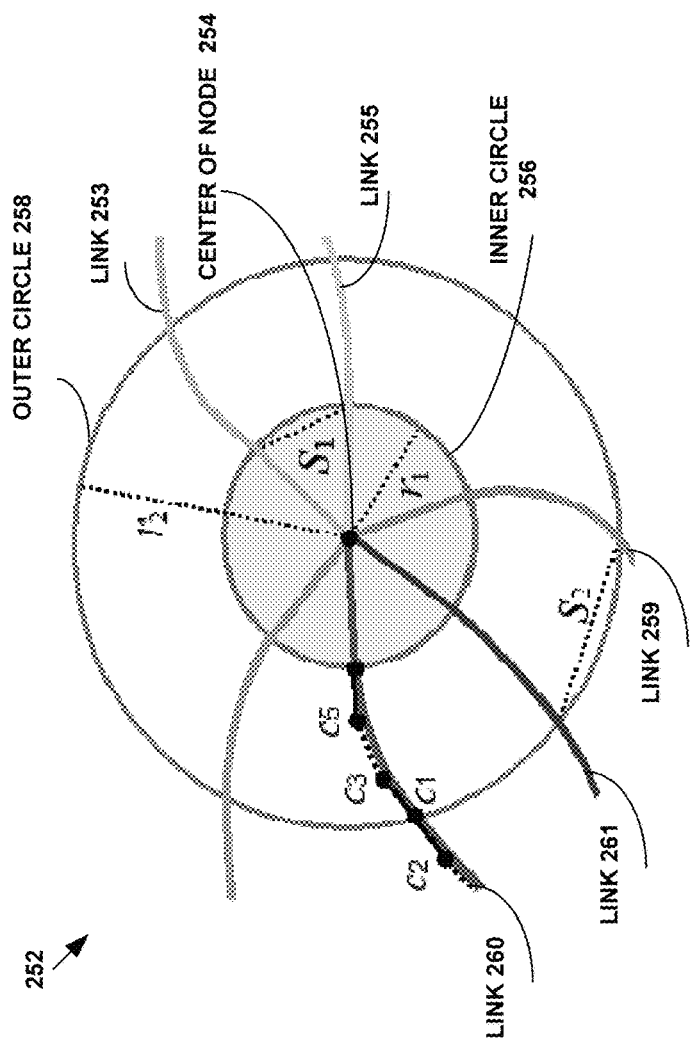
FIGS. 10A-10B are exemplary illustrations showing interactive link fanning.
Figure 10A:
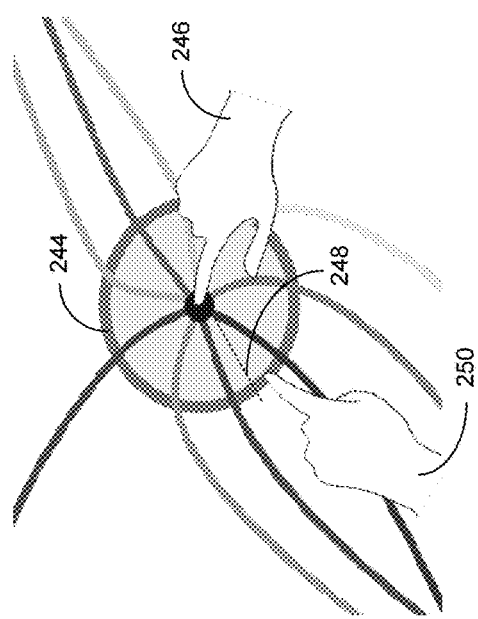

FIG. 10B illustrates an example of interactive fanning applied to node 252 using two concentric circles: inner circle 256, having radius r1; and outer circle 258 having radius r2. The curvature for link 260 is formed from curve segments utilizing control points c1, c2, c3, c5. The angle of separation, $S_1$, between links 253 and 255 on the inner circle 256 meets the minimum separation distance and the angle of separation, S2, between links 259 and 261 on the outer circle 258 meets the minimum separation distance.

Figure 11:
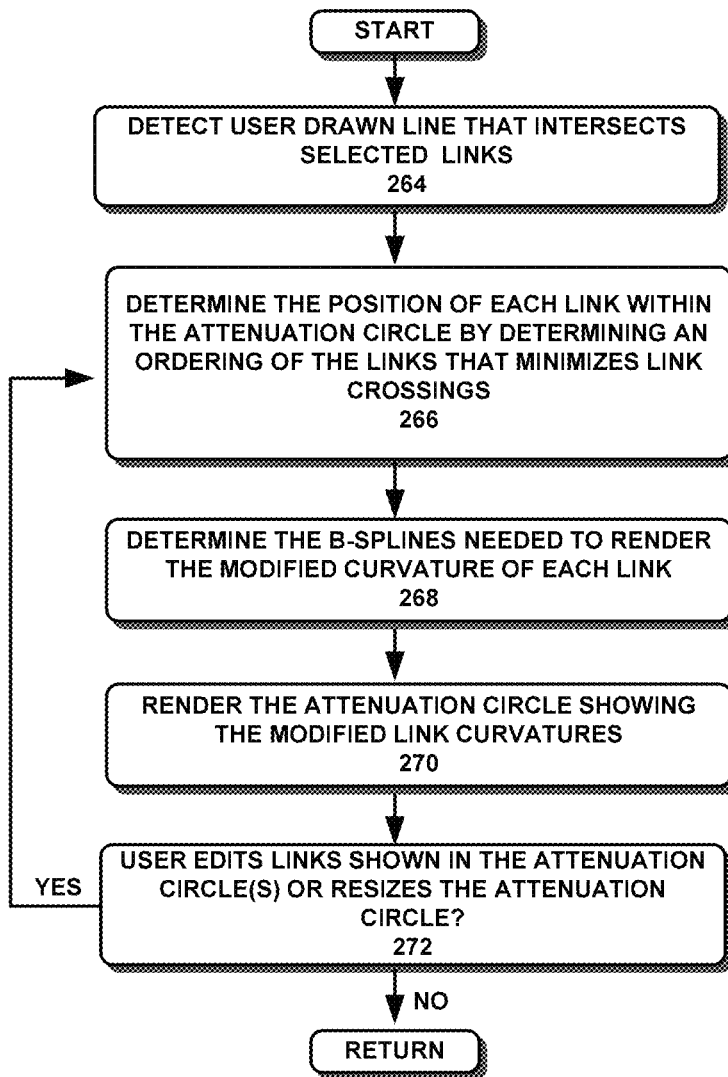
FIG. 11 is a flow diagram illustrating an exemplary method of interactive link bundling.

Attention now turns to interactive bundling. FIG. 11 illustrates a flow diagram of an exemplary method 212 for performing interactive bundling. It should be noted that the method 212 may be representative of some or all of the operations executed by one or more embodiments described herein and that the method can include more or less operations than what is described in FIG. 11.

Referring to FIGS. 4 and 11, a user may indicate their preference to bundle a set of links by placing a line through the set of links of interest (block 264). The line may be marked onto a node-link diagram 104 through a keystroke, mouse clicks, touches, gestures, or the like from the user's computing device. The line is used to create an attenuation circle 132 that is centered at the midpoint of the line. The links within the attenuation circle 132 are displayed with a larger angular separation from each other thereby making them more visible to the user.

The links are better viewed when there is minimal crossing between the links. For this reason, the interactive bundling module 112 determines an order of the links to enter and exit a node that minimizes the number of link crossings that occur between nodes. The problem of determining such an order is the classic metro line crossing minimization problem. The interactive bundling module 112 may utilize any of the well-known solutions to the metro line crossing minimization problem to determine such an ordering (block 266). Next, the splines needed to render the modified link curvatures of each link is determined (block 268). Default values for the size of the attenuation circle (i.e., R, the radius of the attenuation circle) and the minimum separation, S, needed between two adjacent links is determined. The attenuation circle 132 may then be rendered onto a display for the user showing the links with the modified link curvatures (block 270).

A user may then edit the attenuation circle 132 (block 272). The user may edit the links entering into the attenuation circle 132, may resize the attenuation circle 132, or make any other type of edit to the links or the attenuation circle 132 (block 272). The edits the user makes to the links and/or attenuation circle may alter the values of R and S, thereby requiring the interactive bundling module 112 to re-compute the link curvatures shown in the attenuation circle 132. In this situation (block 272—yes), the interactive bundling module 112 repeats the processing shown in blocks 266-272. When the user has no further edits to the bundled links or attenuation circle 132 (block 272—no), then the method returns back to FIG. 7.

Figure 12:
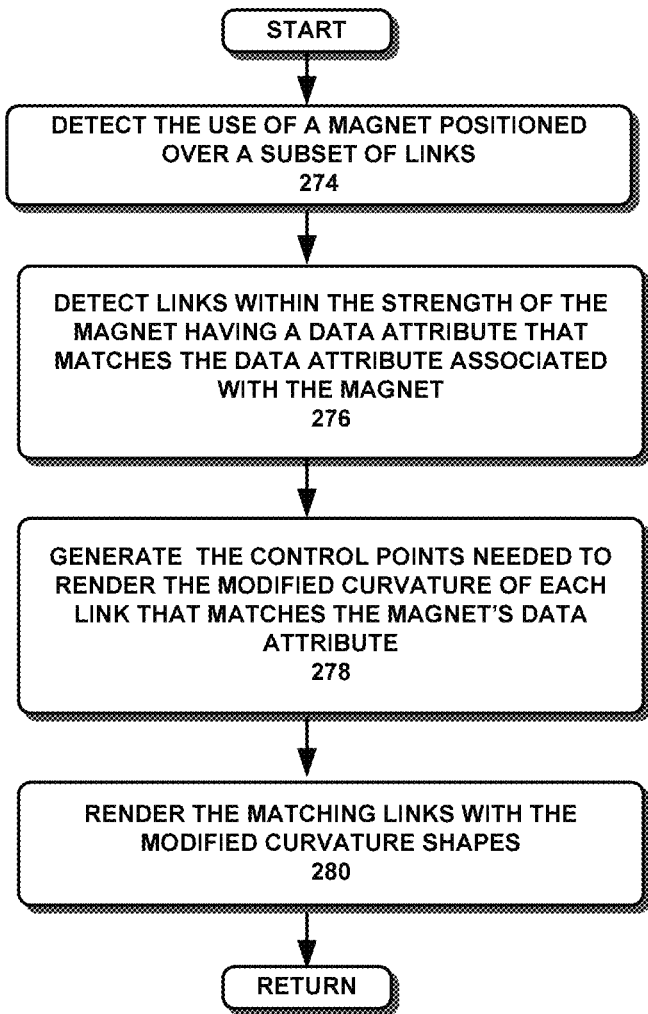
FIG. 12 is a flow diagram illustrating an exemplary method of interactive link magnets.

FIG. 12 illustrates a flow diagram of an exemplary method 216 of the interactive link magnet technique. It should be noted that the method 216 may be representative of some or all of the operations executed by one or more embodiments described herein and that the method can include more or less operations than what is described in FIG. 12.

A link magnet is a visualization technique that mimics the behavior of a physical magnet. A physical magnet has a magnetic force that pulls objects having ferromagnetic materials towards it and that repels objects composed of other types of materials. The magnetic force of a physical magnet extends within a given radius from the center of the magnet. A link magnet is configured to pull links that are associated with a particular data attribute towards it. A link magnet may have a magnetic strength that enables it to attract links within the radius of the link magnet. A user is provided with the ability to specify the magnetic strength of the magnet and one or more data attributes the magnet is attracted to. A link magnet may be implemented as draggable graphics software that is programmed to search for links having a common data attribute within a given radius and to move the curvature of the links towards the magnet.

Referring to FIG. 12, the interactive link magnet module 114 detects the use of a magnet positioned over a subset of links (block 274). The link magnet then detects links within the strength of the magnet or prescribed radius that are associated with a data attribute that matches the data attribute associated with the link magnet (block 276). For those matching links, the interactive link magnet module 114 generates the control points needed to render the modified curvature of each matching link in the direction and distance exerted by the user through the link magnet (block 278). The spline rendering module 118 may then render the matching links with the modified curvature shapes to the user (block 280).

Figure 13:
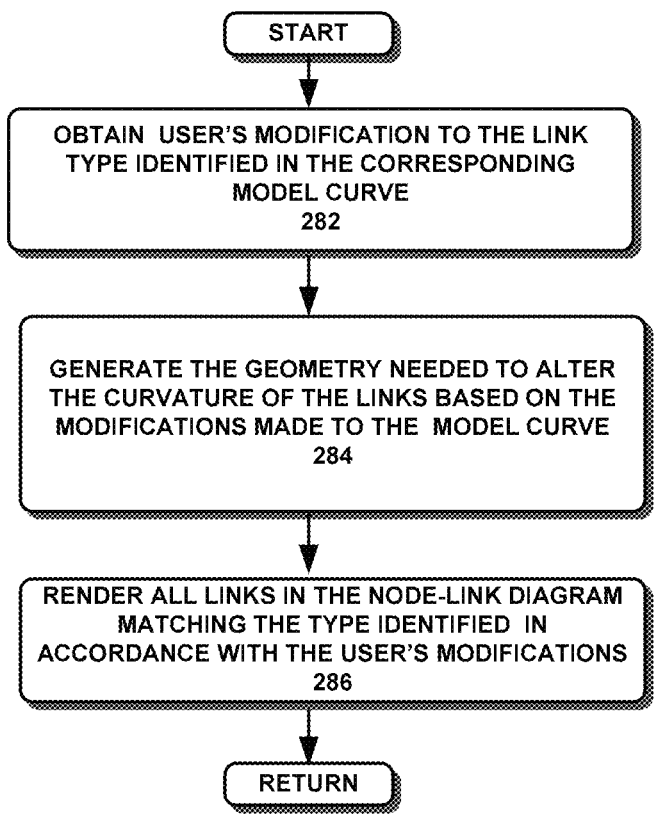
FIG. 13 is a flow diagram illustrating an exemplary method for interactive link legends.

Attention now turns to the interactive link legends technique. FIG. 13 illustrates a flow diagram of an exemplary method 218 of the interactive link legends technique. It should be noted that the method 218 may be representative of some or all of the operations executed by one or more embodiments described herein and that the method can include more or less operations than what is described in FIG. 13.

The user controls the curvature of a set of links by modifying the curvature of a model curve of the identified type shown in a legend associated with the node-link diagram (block 282). In one or more embodiments, the model curve may be based on B-splines. Referring to FIG. 14A, there is shown a legend 288 having a model curve based on B-splines. The legend shows a model curve for link 294 between source node 290 and target node 292. The link 294 was modified by a user to increase the amplitude, d, and the skew angle, ∝, of the model curve by interacting with a single point on the curve, c1. Control points c2-c5 are formulated to generate the new curvature in accordance with the user's actions on the model curve. However, as the new curvature is propagated to other links of the same type, there may be strong variations of the curvature due to the varied distances between each link's respective source and destination nodes. For this reason, another embodiment of the model curve is described with respect to FIG. 14B that preserves the amplitude and overall shape of the links independent of the distance between each link's source and destination node.

FIG. 14B illustrates the interactive model curve 296 based on a motif having a sinusoidal curve. A user may control the amplitude and periodicity of the sinusoidal curve by interacting with two points on the curve, c1 and c2. The new curvature 298, as shown in FIG. 14C, may easily be repeated onto each corresponding link with a consistent curvature since it is independent of the distance between each link's corresponding source and destination node.

Referring back to FIG. 13, based on the modifications made to a model curve, the interactive link legends module 115 generates the necessary geometric data needed to alter the curvature of the links of the identified type throughout the node-link diagram (block 284). This geometric data is then used to render the new curvature to the links of the identified type throughout the node-link diagram (block 286).

Figure 15:
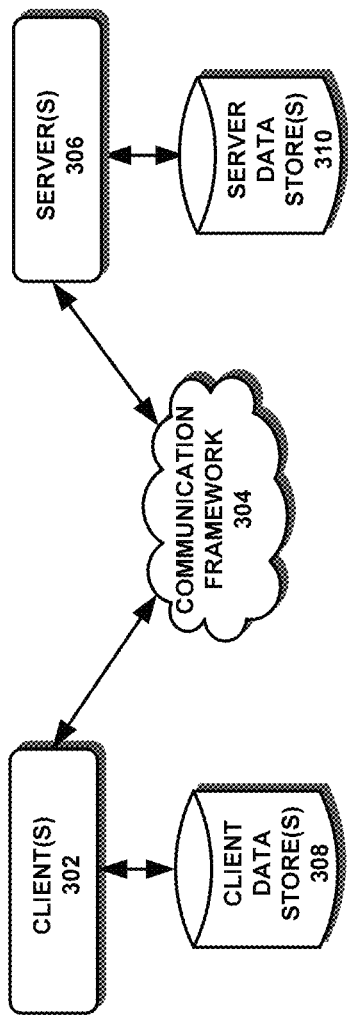
FIG. 15 is a block diagram illustrating an operating environment.

Attention now turns to a discussion of an exemplary operating environment. FIG. 15 illustrates an operating environment 300. It should be noted that the operating environment 300 is exemplary and is not intended to suggest any limitation as to the functionality of the embodiments. The embodiments may be applied to an operating environment 300 having one or more client(s) 302 in communication through a communications framework 304 with one or more server(s) 306. The operating environment 300 may be configured in a network environment, a distributed environment, a multiprocessor environment, or as a stand-alone computing device having access to remote or local storage devices.

A client 302 may be embodied as a hardware device, a software module, or as a combination thereof. Examples of such hardware devices may include, but are not limited to, a computer (e.g., server, personal computer, laptop, etc.), a cell phone, a personal digital assistant, or any type of computing device, and the like. A client 302 may also be embodied as a software module having instructions that execute in a single execution path, multiple concurrent execution paths (e.g., thread, process, etc.), or in any other manner.

A server 306 may be embodied as a hardware device, a software module, or as a combination thereof. Examples of such hardware devices may include, but are not limited to, a computer (e.g., server, personal computer, laptop, etc.), a cell phone, a personal digital assistant, or any type of computing device, and the like. A server 306 may also be embodied as a software module having instructions that execute in a single execution path, multiple concurrent execution paths (e.g., thread, process, etc.), or in any other manner.

The communications framework 304 facilitates communications between the clients 302 and the servers 306. The communications framework 304 may embody any well-known communication techniques, such as techniques suitable for use with packet-switched networks (e.g., public networks such as the Internet, private networks such as enterprise intranet, and so forth), circuit-switched networks (e.g., the public switched telephone network), or a combination of packet-switched networks and circuit-switched networks (with suitable gateways and translators). A client 302 and a server 306 may include various types of standard communication elements designed to be interoperable with the communications framework 304, such as one or more communications interfaces, network interfaces, network interface cards, radios, wireless transmitters/receivers, wired and/or wireless communication media, physical connectors, and so forth. Examples of wired communications media may include a wire, cable, metal leads, printed circuit boards, backplanes, switch fabrics, semiconductor material, twisted-pair wire, coaxial cable, fiber optics, a propagated signal, and so forth. Examples of wireless communications media may include acoustic, radio frequency spectrum, infrared, and other wireless media.

Each client(s) 302 may be coupled to one or more client data store(s) 308 that store information local to the client 302. Each server(s) 306 may be coupled to one or more server data store(s) 310 that store information local to the server 306.

Figure 16:
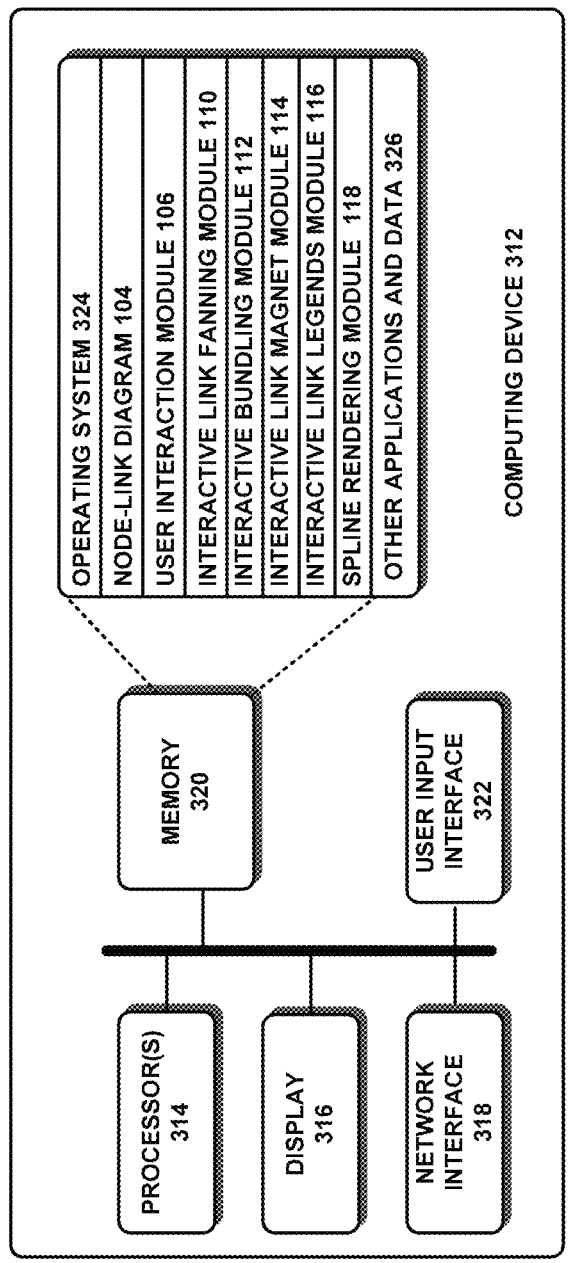
FIG. 16 is a block diagram illustrating an exemplary computing device.

FIG. 16 illustrates a block diagram of an exemplary computing device 312. The computing device 312 may have one or more processors 314, a display 316, a network interface 318, a memory 320, and a user input interface 322. A processor 314 may be any commercially available processor and may include dual microprocessors and multi-processor architectures. The display 316 may be any visual display unit including a display having touch capabilities. The network interface 318 facilitates wired or wireless communications between the computing device 312 and a network. The user input interface 322 facilitates communications between the computing device 312 and input devices, such as a keyboard, mouse, touch screen, etc.

The memory 320 may be any computer-readable storage media that may store executable procedures, applications, and data. The computer-readable media does not pertain to propagated signals, such as modulated data signals transmitted through a carrier wave. It may be any type of memory device (e.g., random access memory, read-only memory, etc.), magnetic storage, volatile storage, non-volatile storage, optical storage, DVD, CD, floppy disk drive, and the like. The memory 320 may also include one or more external storage devices or remotely located storage devices. The memory 320 may store executable computer program instructions that, when executed by a processor, cause the processor to perform methods and/or operations in accordance with the described embodiments. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The memory may 320 contain instructions and data as follows:

an operating system 324;
a node-link diagram 104;
an user interaction module 106;
an interactive link fanning module 110;
an interactive bundling module 112;
an interactive link magnet module 114;
an interactive link legends module 116;
a spline rendering module 118; and
various other applications and data 326.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system, comprising:
at least one processor and a memory; the memory storing thereon processor-executable instructions, that when executed on the at least one processor, cause the processor to perform acts comprising:
display a node-link diagram, the node-link diagram having a plurality of nodes and a plurality of links, a link being a curve connecting a source node to a target node, at least one link associated with a first data attribute;
detect an interactive link magnet associated with the first data attribute positioned in close proximity to the node-link diagram, the interactive link magnet having a magnetic attraction with links associated with the first data attribute; and
alter curvature of the at least one link associated with the first data attribute without moving the source node and the target node in a direction towards the interactive link magnet in response to the interactive link magnet attracting the at least one link associated with the first data attribute.

2. The system of claim 1, wherein the processor-executable instructions, when executed on the at least one processor, cause the processor to perform further acts that:
separate out the at least one link associated with the first data attribute from other links in the node-link diagram not associated with the first data attribute.

3. The system of claim 1, wherein the at least one link associated with the first data attribute is distinguishable from other links in the node-link diagram not associated with the first data attribute.

4. The system of claim 1, further comprising:
a line magnet having two magnets arranged in a linear form.

5. The system of claim 1, wherein strength of the link magnet pulls the at least one link associated with the first data attribute a distance of radius r from an original position of the at least one link associated with the first data attribute.

6. The system of claim 1, wherein the processor-executable instructions, when executed on the at least one processor, cause the processor to perform further acts that:
modify curvature of the at least one link associated with the first data attribute by defining control points to generate a spline curve representing a modified link.

7. The system of claim 1, wherein the interactive link magnet is a draggable graphics software programmed to search for links having the first data attribute within a given radius of a position of the interactive link magnet.

8. A method, comprising:
displaying a node-link diagram;
using an interactive link magnet associated with a label to attract one or more links in the node-link diagram that are associated with the label, wherein a link represents a curve connecting a source node to a target node in the node-link diagram, the interactive link magnet having a magnetic strength that exhibits an attraction of links associated with the label within a defined radius; and
in response to the interactive link magnet being positioned in close proximity to the node-link diagram, modifying curves of the one or more links associated with the label without altering placement of a respective source node and target node.

9. The method of claim 8, wherein the modified curves separate out the one or more links associated with the label from other links in the node-link diagram not associated with the label.

10. The method of claim 8, wherein the interactive link magnet includes two magnets, wherein each magnet has a different magnetic strength and different defined radius.

11. The method of claim 8, wherein the interactive link magnet includes two magnets, wherein each magnet has a same magnetic strength and a same defined radius.

12. The method of claim 8, wherein modifying curves of the one or more links associated with the label further comprises:
generate control points needed to render the modified curvature of each link that matches the label of the interactive link magnet towards a center of the interactive link magnet without altering position of the source node and the target node of a link.

13. The method of claim 8, wherein the magnetic strength of the interactive link magnet is user-defined.

14. The method of claim 8, wherein the interactive link magnet is a software object programmed to search for links having the label within a radius associated with the interactive link magnet.

15. The method of claim 8, wherein the defined radius is user defined.

16. A device, comprising:
one or more processors and a memory;
wherein the at least one processor is configured to:
search for one or more links associated with a data attribute in a node-link diagram within a defined radius of a draggable graphic software object, wherein the one or more links are part of a node-link diagram, the node-link diagram including one or more nodes connected with a link representing a curve between a source node and a target node; and
alter one or more curves of the one or more links associated with the data attribute in a direction towards the draggable graphic software object without changing a position of the source node and the target node of the altered one or more curves, wherein the draggable graphic software object has a magnetic strength that exhibits an attraction of links associated with the data attribute.

17. The device of claim 16, wherein the draggable graphic software object is an interactive link magnet having a magnetic strength that separates the links associated with first data attribute from links not associated with the first data attribute.

18. The device of claim 16, wherein the draggable software object includes two magnets configured in a linear form.

19. The device of claim 16, wherein the at least one processor is configured to:
  generate one or more control points to alter one or more curves of the one or more links associated with the data attribute in a direction towards the draggable graphic software object without changing a position of a source node and a target node of the altered one or more curves.

20. The device of claim 16, wherein the defined radius of the draggable graphics software object is user defined.

* * * * *